INVENTOR.
ARTHUR SUSSMAN
BY
J.B. Felshin
ATTORNEY.

Aug. 21, 1962 A. SUSSMAN 3,049,903
APPARATUS FOR STEAMING AND DRYING ARTICLES
Filed Feb. 7, 1961 4 Sheets-Sheet 2

INVENTOR.
ARTHUR SUSSMAN
BY
J. B. Felshin
ATTORNEY

INVENTOR.
ARTHUR SUSSMAN
BY
J.B. Felshin
ATTORNEY.

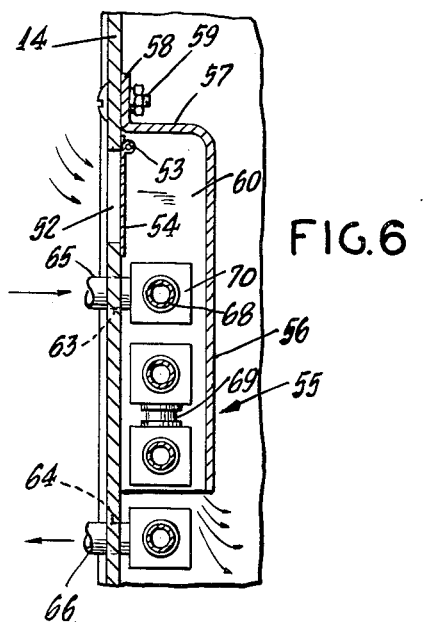
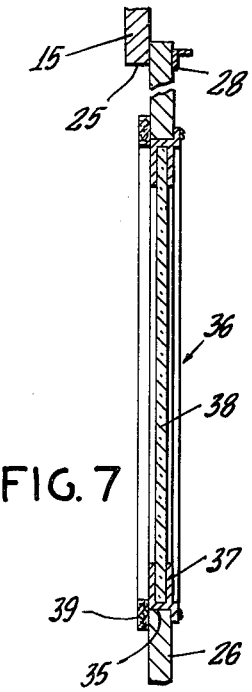
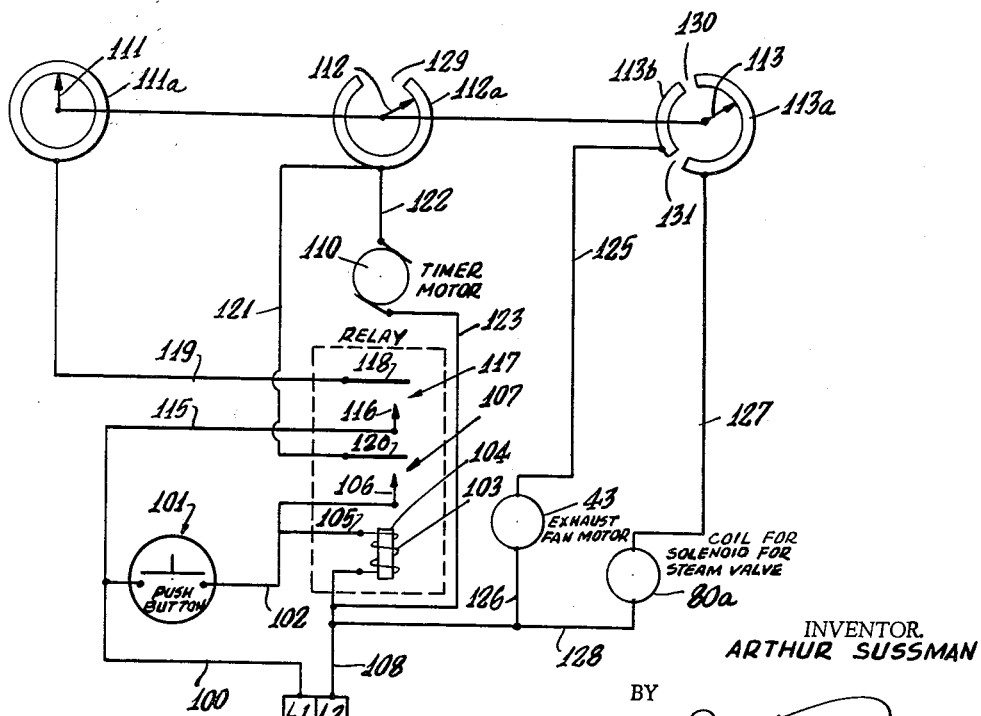

United States Patent Office 3,049,903
Patented Aug. 21, 1962

3,049,903
APPARATUS FOR STEAMING AND DRYING ARTICLES
Arthur Sussman, New York, N.Y., assignor to Automatic Steam Products Corp., New York, N.Y., a corporation of New York
Filed Feb. 7, 1961, Ser. No. 87,692
5 Claims. (Cl. 68—5)

This invention relates to apparatus for steaming and drying articles. More particularly, it relates to apparatus to steam garments or clothing to remove wrinkles, and then to dry the steamed garments.

An object of this invention is to provide apparatus of the character described, comprising a cabinet provided with means to hang cleaned garments therein, with means to preheat the cabinet and means to introduce live steam into the preheated cabinet so that the live steam will not condense and to provide greater humidification or diffusion so that the garments in the cabinet will more readily absorb the steam, whereby the garments will straighten out and lose their wrinkles.

A further object of this invention is to provide, in apparatus of the character described, means to stop the flow of live steam into the cabinet, and to thereafter cause air to pass through the cabinet while the air is heated, to clear the cabinet of steam and fill the cabinet with hot dry air, to dry the clothes in the cabinet after they have straightened out and lost their wrinkles.

Still another object of this invention is to provide apparatus of the character described comprising a cabinet having an air inlet opening, heating means in the cabinet adjacent said opening, and timer means controlling a cycle consisting of injection of live steam into the cabinet for a predetermined period of time, to smooth out the clothes, followed by shutting off the live steam, and drawing air out of the cabinet through an air outlet for another period of time, so that fresh air will enter through the inlet opening of the cabinet, and pass over the heating means for a subsequent predetermined period of time, whereby to clear the cabinet of steam and fill the cabinet with hot dry air to dry clothes in the cabinet, and whereupon, after the drawing of air out of the cabinet terminates, the cabinet door may be opened and the smoothed out, dry clothes may be removed.

Still another object of this invention is to provide coin operated means to control the timer.

A further object of this invention is to provide a strong and durable apparatus of the character described which shall be relatively inexpensive to manufacture, easy to manipulate and practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described, and of which the scope of invention will be indicated in the following claims.

In the accompanying drawings in which is shown an illustrative embodiment of this invention.

FIG. 6 is an enlarged cross-sectional view taken on line 6—6 of FIG. 3;

FIG. 7 is a cross-sectional view taken on line 7—7 of FIG. 1;

FIG. 10 is a wiring diagram of the timer circuit for controlling flow of live steam into the cabinet forming part of the apparatus, and for controlling operation of an electric fan to draw air and steam out of the cabinet.

Figure 1:
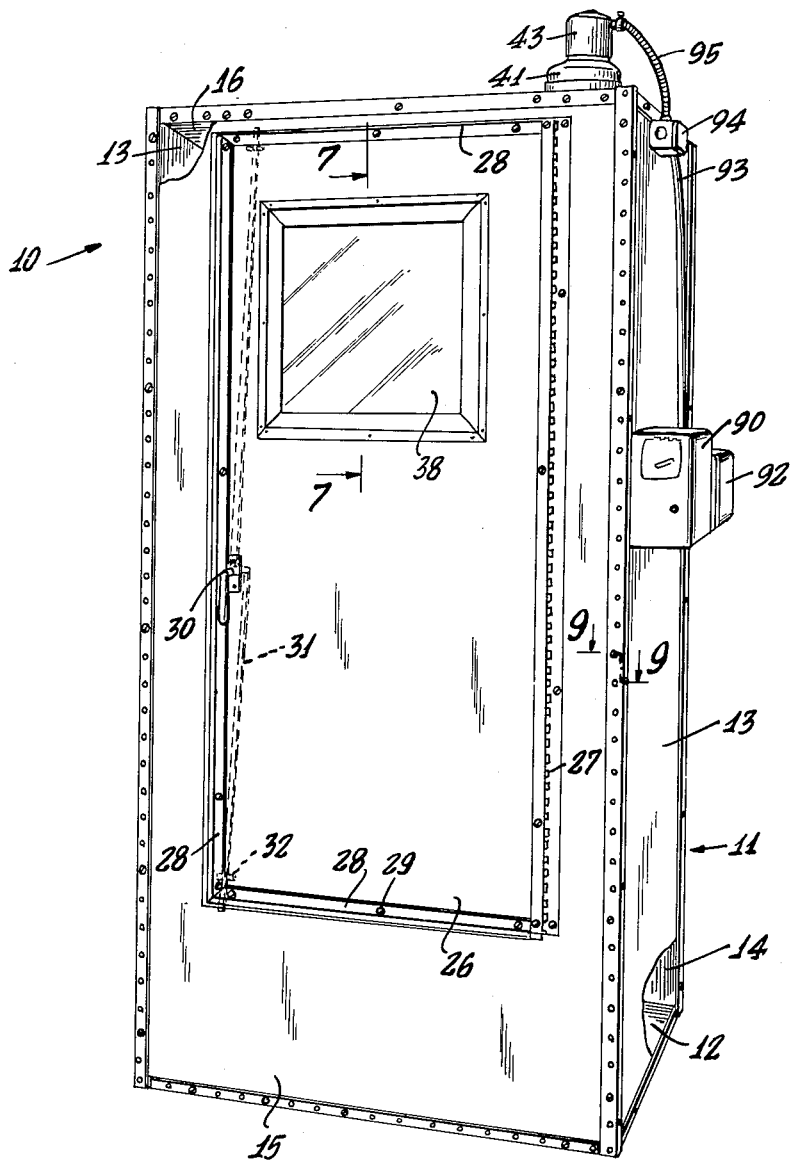
FIG. 1 is a front perspective view of apparatus embodying the invention.
Figure 2:
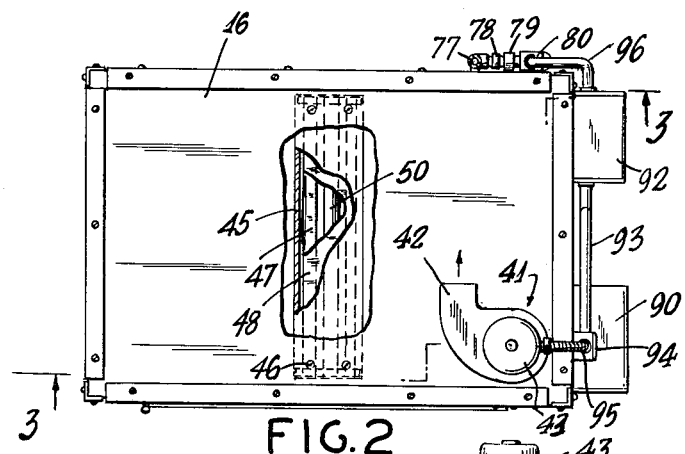
FIG. 2 is a top plan view of said apparatus, with parts broken away and in cross-section.

Referring now in detail to the drawing, 10 designates apparatus embodying the invention.

Said apparatus comprises a cabinet 11 provided with a bottom wall 12, side walls 13, a rear wall 14, a front wall 15 and a top wall 16. These walls are all rectangular panels of asbestos cement board or made of other heat moulding material. They are arranged to make a prismatic cabinet with meeting edges attached together at all corners by elongated metal angle shaped pieces 20 bolted to the boards by bolts 21 passing through spaced openings 22 in the boards.

The front wall 15 is formed with a door opening 25 closed by a door 26 also made of a panel or board of asbestos cement or other heat insulating material. The door 26 is hinged at one side edge to a side of the front wall 15, by means of a piano type hinge 27. The upper, lower and outer edges of the door may be reinforced by angle shaped bars 28 screwed or bolted thereto, as at 29.

The door may be provided with a handle 30 actuating elongated lock bars 31 at the inside of the door, passing through guide loops 32 fixed to the door adjacent the upper and lower ends thereof. Upon turning the handle in one direction, the bars 31 move away from each other and into engagement with the inside of the front wall 15 above and below the door, to latch the door to said wall. Upon turning the handle in an opposite direction, the bars 31 are retracted to allow the door to be opened.

Said door may overlap the front wall at the edges of the door opening 25.

The door 26 is formed with a rectangular door window opening 35 into which is fitted a window 36. Window 36 may comprise a frame 37 carrying a transparent pane 38 of glass or other suitable material. Stripping 39 of sponge may be fixed to the inside of the door to overlap the edges of the window opening 35, to absorb condensation at the window.

The top wall 16 is formed, adjacent its front end, and near the right side wall with an opening 40. Fixed to the top of the top wall and over said opening 40 is an electric exhaust fan 41 having a rearwardly extending outlet end 42. The fan is actuated by an electric motor 43.

Fixed to the underside of said top wall 16, centrally thereof and running from the back wall to the front wall, is a track member suspended from the top wall by pins 46. Track 45 has in-turned side portions 47 slidably supporting plates 48 from which is suspended by pins 49, a rod 50 on which clothes hangers may be mounted, to hang clothes in the cabinet. The rod 50 may be pulled forwardly out of the cabinet through the open door of the latter, to facilitate putting clothes into the cabinet or removing them therefrom.

The back wall 14 of the cabinet is formed, closer to its lower end than to its upper end, with a horizontal slot 52. Hinged to the inner side of said back wall, just above said slot 52, as by hinge 53, is a flap closure plate 54 for the slot. Fixed to the inside of back wall 14, above hinge 53, is a hood 55. Said hood comprises a wall 56 parallel to back wall 14 and spaced therefrom. Extending rearwardly from the upper end of wall 56 is a top wall 57 located above slot 52 and from which extends upwardly a flange 58 contacting the inside of wall 14 and bolted thereto by bolts 59. Extending from the sides of wall 56 are side walls 60 extending to said back wall 14. Thus, air entering the cabinet through slot 52 may move downwardly and out into the cabinet below the hood 55.

Back wall 14 is formed with vertically aligned openings 63, 64, the former just below slot 52 and at one end thereof, and the latter below said hood. Extending through opening 63 is a steam inlet pipe 65 and through opening 64, a steam outlet pipe 66. Pipes 65, 66 are interconnected by a zig-zag pipe coil 67 comprising horizontal lengths of pipe 68 connected by vertical end pipe portions 69. The horizontal pipes may carry heat diffusing vanes 70. Most of the pipe coil 67 is located within the hood 55 and the lower part thereof projects below the hood. The pipe coil is located beneath slot 52 close to back wall 14. Thus, air entering slot 52 and moving downwardly will pass down over the coil 67 and will hence be heated thereby. Outlet pipe 66 leads to a drain.

Figure 8:
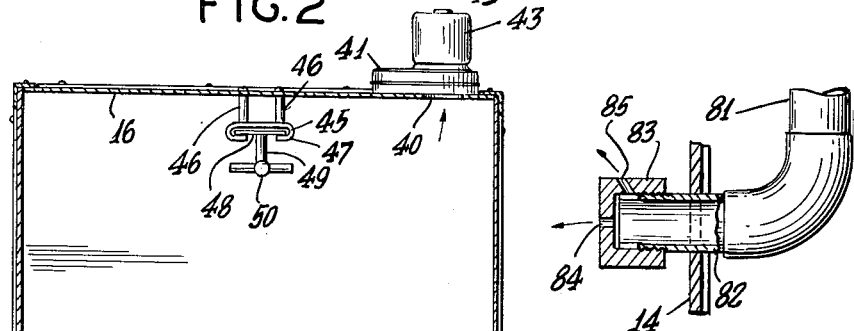
FIG. 8 is a cross-sectional view taken on line 8—8 of FIG. 3.
Figure 3:
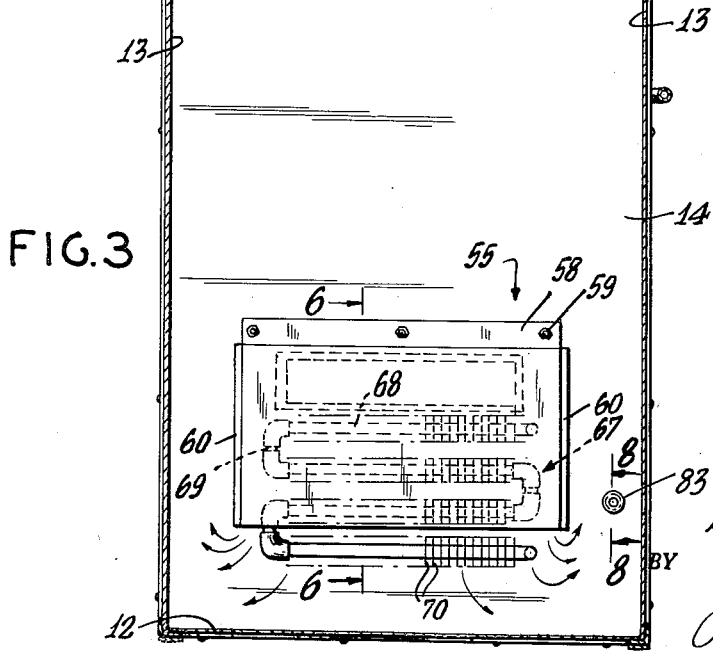
FIG. 3 is a cross-sectional view taken on line 3—3 of FIG. 2.
Figures 4, 5:
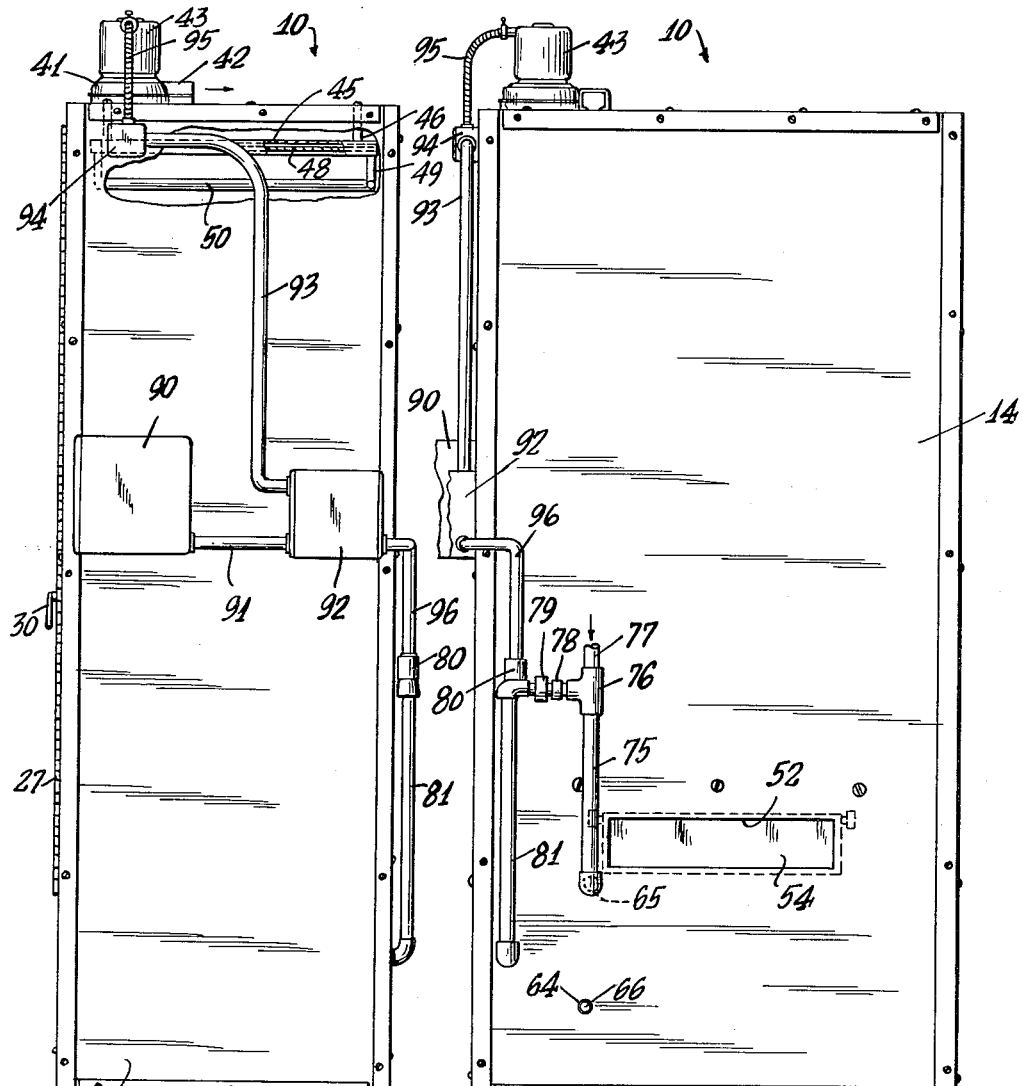
FIG. 4 is a rear elevational view of the apparatus.
FIG. 5 is a side elevational view thereof.
Figure 9:
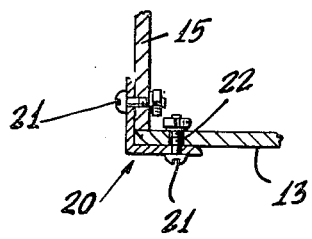
FIG. 9 is an enlarged cross-sectional view taken on line 9—9 of FIG. 1.

Inlet pipe 65 (FIG. 4) is connected to a vertical pipe 75 extending upwardly, outside of, and close to back wall 14. The upper end of pipe 75 is connected to one vertical branch of a T-fitting 76. A pipe 77 extending from a supply of steam, connects to another vertical branch of the T-fitting 76. A horizontal branch of said T-fitting is connected by a union 78 through a strainer 79 to the inlet of a solenoid actuated valve 80. Said valve has an outlet connected to a vertical pipe 81 extending downwardly along the outside of the cabinet. The lower end of pipe 81 (FIG. 8) is connected to a horizontal tube 82 passing through an opening in the back wall 14 into the cabinet at one side of the hood 55. Screwed to the end of tube 82 is a cap 83 formed with a central nozzle opening 84 and with an inclined nozzle opening 85 located in a horizontal plane. When the solenoid valve 80 is open, steam passes from pipe 77 through strainer 79, valve 80, pipe 81 and tube 82 to nozzle openings 84, 85. Live steam thus jets into the cabinet through opening 84 forwardly, and through opening 85 diagonally across the cabinet.

Attached to one side wall 13 (FIG. 5) is a coin-control mechanism 90 connected by conduit 91 for electric wires to a timer 92. Timer 92 is connected by a conduit 93 to a junction box from which wiring passes through a conduit 95 to the motor 43 for the fan 41. Timer 92 is connected to the solenoid valve 80 by a conduit 96 for wiring.

In FIG. 10 there is shown a wiring diagram for the electrical controls. In said figure $L_1$, $L_2$ designate the power lead lines. Power line $L_1$ is connected through wire 100 to one side of a manual or coin actuated push button switch 101. The other side of the push button switch 101 is connected by wire 102 to one side of a coil 103 of a relay magnet 104. Wire 102 is also connected by wire 105 to a fixed contact 106 of a switch 107 controlled by relay magnet 104. The other side of coil 103 is connected by wire 108 to power line $L_2$.

The timer 92 comprises a clock timer motor 110 which is arranged to rotate coaxial conductively connected conductive arms or pointers 111, 112, 113.

Pointer 111 contacts a circular conductive closed ring 111a. Pointer 112 contacts an arcuate open ring or segment strip 112a. The conductor 112a comprises the greater part of a circle. Pointer 113 contacts two arcuate spaced conductive segmental portions 113a, 113b. The pointers 111, 112, 113 are conductively interconnected and are rotated by the clock timer motor 110.

Wire 100 is connected by wire 115 to a fixed contact 116 of a second switch 117 controlled by the relay magnet 104. The movable contact 118 for switch 117 is connected by wire 119 to the circular conductive member 111a.

The movable contact 120 of switch 107 is connected by wire 121 to arcuate strip 112a. Said arcuate strip 112a is connected by wire 122 to one side of the timer motor 110. The other side of the timer motor 110 is connected by wire 123 to wire 108 and hence to power line $L_2$.

Arcuate strip 113b is connected by wire 125 to one side of the exhaust fan motor 43. The other side of the fan motor 43 is connected by wire 126 to wire 108 and hence to power line $L_2$. Arcuate strip 113a is connected by wire 127 to one side of the coil 80a for the solenoid for steam valve 80. The other side of said coil is connected by wire 128 to wire 108 and hence to power line $L_2$. The wiring passes through the conduits 91, 93, 95, 96 and junction box 94 described above.

The operation of the apparatus will now be described.

The purpose of the apparatus is to steam cleaned garments to remove wrinkles, and then to dry the steamed garments. During steaming the garments absorb moisture and then hot air circulating in the cabinet dries the garments. The interior of the cabinet is kept warm and is preheated by steam constantly passing through pipes 77, 75 and steam coil 67.

By opening the door, garments on hangers may be hung on the rack rod 50, and the door then closed. A coin may then be inserted into the coin box. At this time the pointer 112 is in the space 129 between the ends of arcuate conductor 112a, and pointer 113 is in the space 130 between arcuate conductors 113a, 113b. Insertion of the coin may close push button 101, or may allow manual closing of said push button. The closing of the push button 101 closes the circuit for relay 104 which closes switches 107, 117. Closing of switch 107 energizes timer motor 110. Means may be provided to keep the timer motor energized until pointers 112, 113 reach segments 112a, 113a, respectively, or a manual means may be provided to rotate said pointers to contact said segments. After said segments have been contacted by said pointers, opening of the push button switch 101 will not de-energize the relay. The relay will be held energized through wires 100, 115, switch 117, wire 119, conductor 111a, pointers 111, 112, segment 112a, wire 121, switch 107, wire 105, coil 103 and wire 108.

The timer motor remains energized while pointer 112 remains in contact with segment 112a, through wires 100, 115, switch 117, wire 119, conductor 111a, pointers 111, 112, wire 122, timer motor 110 and wires 123, 108. The timer motor also rotates pointer 113. When pointer 113 contacts segment 113a, the coil 80a for the solenoid valve 80 is energized through wires 127, 128, 108 to allow live steam to enter the cabinet. This continues for a predetermined period of time according to angular extent of segment 113a. When pointer 113 passes beyond segment 113a to space 131, the solenoid valve closes and live steam no longer enters the cabinet. When pointer 113 contacts segment 113b, the exhaust fan motor 43 is energized and air is drawn out of the cabinet to draw out the steam and hence cause fresh air to enter the cabinet through slot 52, causing hinged flap 54 to swing into the cabinet. Thus air flows down over the steam heated coil 67, and the hot air dries the clothing in the cabinet.

The pointers 112, 113 simultaneously move beyond segments 112a, 113b, at which point, the holding circuit for the relay is broken, and the circuit for the timer motor is also broken. Relay magnet 104 is de-energized and the switches 107, 117 open and the cabinet can be opened and the dried clothes removed.

The purpose of the heating coil 67, while air is not being drawn out of the cabinet, is to preheat the cabinet and heat up the metal parts and the asbestos cement walls or panels, so that when live steam comes into the cabinet, it will not condense. The cabinet being hot, permits greater humidification since steam diffuses better in a hot cabinet, and is more readily absorbed by the fabric of the clothing.

When the clothes are first put into the cabinet, they are dry and wrinkled (for example after a dry cleaning operation). As soon as the door is closed, with the cabinet preheated, a coin is inserted and live steam causes hot moisture to be absorbed by the fabric which tends to straighten out. Wool or cotton (natural fibers) are usually coiled, and the heat and moisture tends to straighten them out. The period of air exhaust then dries out the garments, but keeps them warm to eliminate the moisture so that the clothes may be taken out of the cabinet in dry condition.

The coin control may be eliminated if desired, and the push button can be manualy actuated without coins. It may be held down until the flow of steam starts. The push button may then be released and the machine will go through its cycle.

Also the solenoid valve and fan motor may be separately actuated by separate manual switches if desired.

It will thus be seen that there is provided an apparatus in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. In combination, a cabinet having bottom, top, side, rear and front walls, said front wall being formed with a door opening, a door for said opening, a pull out clothes hanger rod slidably mounted near the top of the cabinet, and adapted to be pulled forwardly through the door opening, a steam coil in the cabinet, means to continuously supply steam to said coil, a hood over said coil, an opening near the bottom of the cabinet above the coil and covered by said hood, means to inject live steam into the cabinet for a predetermined period, and electric fan means to draw air out of the cabinet for a predetermined period.

2. The combination of claim 1, the means to inject live steam into the cabinet being located near the bottom of the cabinet, the fan means being located at the top of the cabinet.

3. The combination of claim 2, and a hinged flap to close said opening.

4. The combination of claim 2, in combination with timer means to control the period of actuation of the live steam injecting means and fan means.

5. In combination, a cabinet provided with a door, means near the upper end of the cabinet and accessible through said door to suspendingly support clothing, heating means located within the cabinet and near its lower end, means to operate the heating means to preheat the cabinet, said cabinet having an air outlet opening near its upper end, an air inlet opening near the lower end of the cabinet and located adjacent the heating means, a fan and associated air directing means to force and direct air into the cabinet through said inlet opening, over the heating means to be heated by said heating means, through the cabinet and out of said outlet opening, said heating means functioning to heat the cabinet independently of fan operation, and means additional to the heating means to inject steam into the lower end of the cabinet during the operation of the heating means, and control means operative to set the fan into operation independently of the heating means and subsequent to the operation of the means to inject steam into the cabinet and while the heating means is in operation.

References Cited in the file of this patent

UNITED STATES PATENTS

| | | |
|---|---|---|
| 1,675,160 | Carroll | June 26, 1928 |
| 2,397,091 | Davis | Mar. 26, 1946 |
| 2,443,069 | Gayring | June 8, 1948 |
| 2,732,701 | Smith et al. | Jan. 31, 1956 |
| 2,845,786 | Chrisman | Aug. 5, 1958 |

FOREIGN PATENTS

| | | |
|---|---|---|
| 527,654 | Canada | July 10, 1956 |